United States Patent Office 3,553,679
Patented Jan. 5, 1971

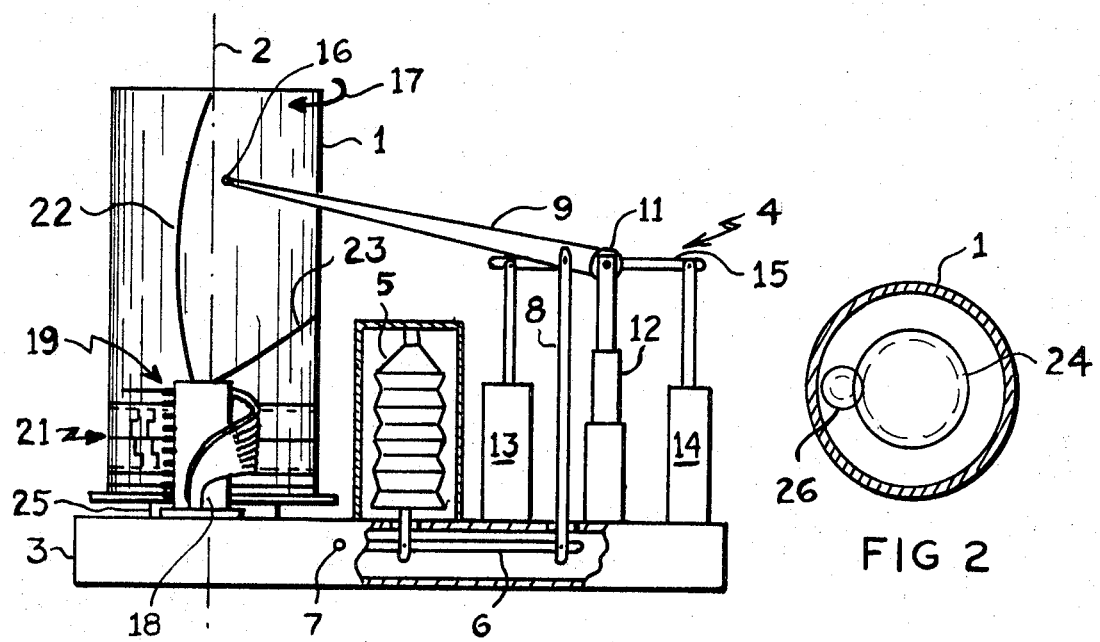
FIG 1
FIG 2
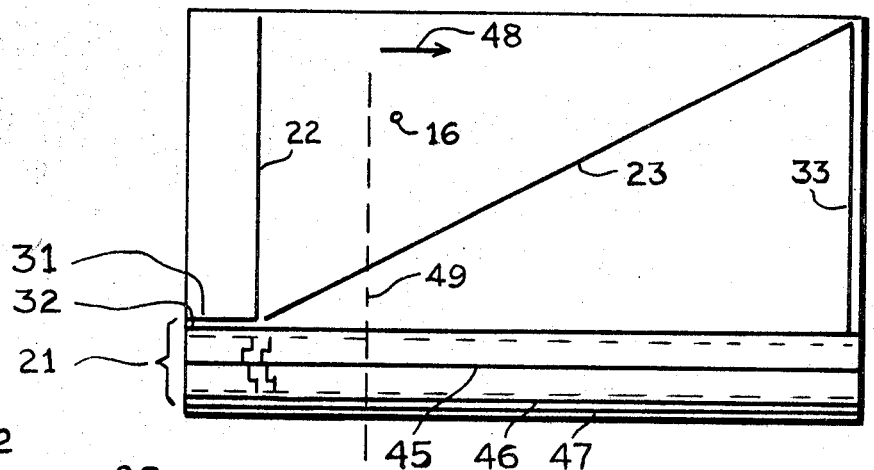
FIG 3
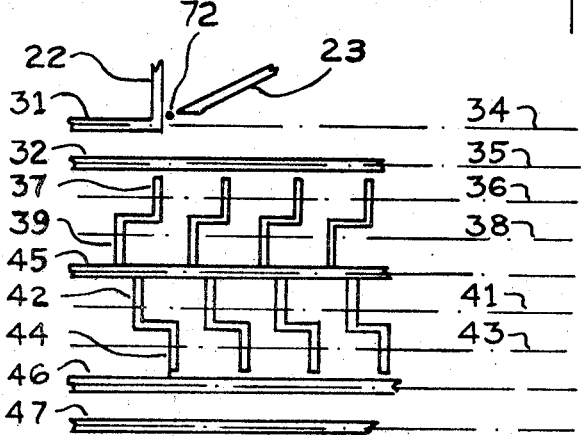
FIG 4
INVENTOR.
HARRY E. ADAMS
BY
Robert T. Dunn

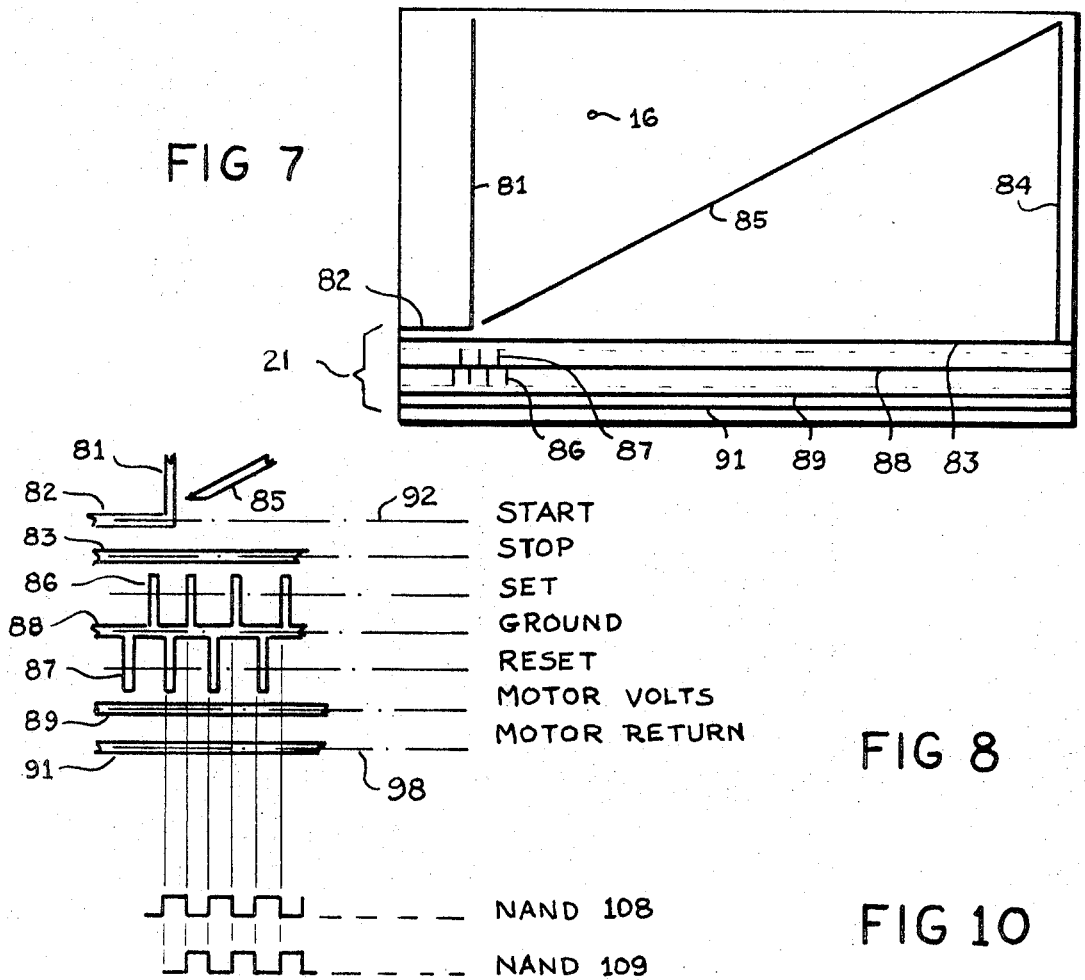
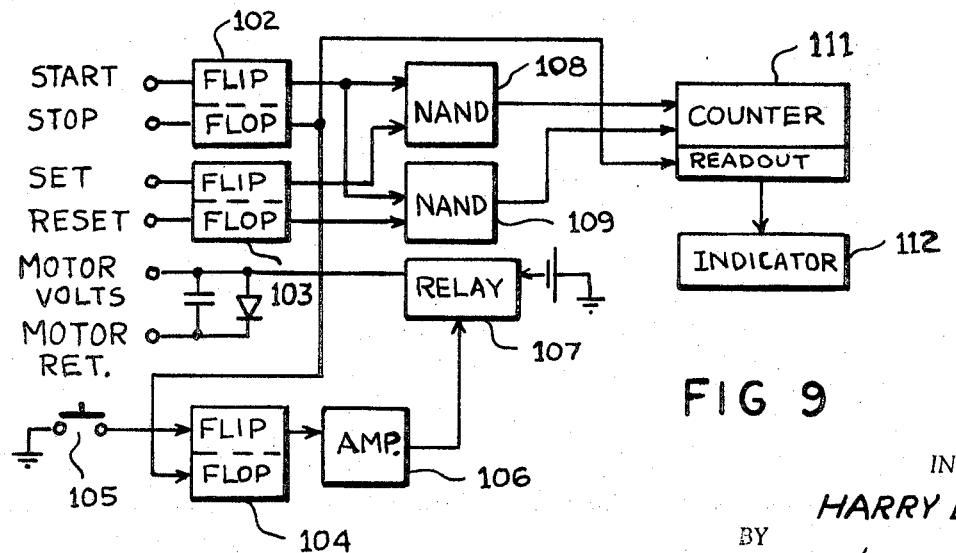

3,553,679
DIGITAL TRANSDUCER
Harry E. Adams, Needham, Mass., assignor to Control
Equipment Corporation, Needham Heights, Mass.
Filed Dec. 14, 1965, Ser. No. 513,689
Int. Cl. H03k *13/00*
U.S. Cl. 340—347          7 Claims

ABSTRACT OF THE DISCLOSURE

A transducer is provided for producing a counted number in a counting device, which represents the position of a body relative to a moveable surface, which is preferably the surface of a drum, which rotates on its axis with the drum axis parallel to the line of different positions of the body. Indices are provided on the drum and an index detector is provided on the body for producing in the detector signals defining an interval of time which is representative of the position of the body. Other indices in the drum are detected as the drum rotates to produce pulses at a rate directly proportional to the rate of rotation of the drum and these pulses are counted in the counting device during the interval to produce the number which represent the position of the body.

---

This invention relates to transducers for converting linear or rotational position of a body into electrical signals and more particularly to such a transducer for producing digital signals representative of the position.

Heretofore, transducers such as recording sensors for recording pressure, temperature or other parameters have included mechanical parts for positioning a recording pen on a chart which is sometimes mounted on a drum so that the pen records on the chart the temperature, pressure or other parameter being measured. In some applications, the pen is positioned in translational positions relative to the chart and in others it is positioned in rotational positions relative to the chart. In either case the accuracy with which the pen is positioned determines the accuracy of the recorded parameter. Recording instruments of this type must be tended by operators who read the charts and use the readings in their calculations.

Heretofore, such recorders have been employed to measure meteorological parameters such as temperature, humidity, pressure, rainfall, etc. For such application, the recorder is necessarily located where such meteorological data is gathered and so the operator must go to this location to tend the recorders and obtain the data. Thereafer, the data is reduced to digital form by manually reading the charts and transferring the data to a compatible storage medium. The data is then fed to computers by which the data is evaluated and compared with similar data from other locations. It is one object of the present invention to facilitate this effort by providing a transducer which converts such meteorological parameters as temperature, humidity, pressure and rainfall directly into digital signals which can be transmitted from the transducer to a distant computer facility.

It is another object of the invention to convert the data to digital form so it can be fed directly into a computer without manual reading or interpretation.

It is another object of the present invention to provide a transducer whose accuracy is independent of external timing signals.

It is another object of the present invention to provide a transducer whose accuracy is independent of the speed of movement of any mechanical mechanism operating the transducer.

It is another object of the present invention to provide a transducer which can be employed on available or standard types of mechanical sensing mechanisms for measuring the meteorological parameters.

It is another object of the present invention to provide means for producing digital signals representative of the position of a body relative to a surface.

In accordance with a principal feature of the present invention, a surface equipped with a plurality of indices and the moving element of a transducer are placed in close proximity and motion is imparted to the surface substantially transverse to the movement of the element so that the element comes into registry with various of the indices producing electrical signals which define a count interval. Meanwhile, other indices on the same surface cooperate with subtantially fixed detectors to produce upon registry therewith electrical pulses which may be transmitted to a distant location along with the signals representing the count interval so that a count of the pulses during the interval may be made at the distant location to obtain a number representative of the position of the element. In a specific embodiment of the invention, the surface is cylindrical and is driven in rotation about the axis of the cylinder while the moveable element of the transducer is positioned in response to a varying parameter such as temperature, humidity, pressure or rainfall, in a direction substantially parallel to the axis of the cylinder and immediately adjacent the surface and in contact therewith. Indices on the cylindrical surface consist of electrically conductive strips some of which contact the element as the cylinder rotates to produce the signals representative of the count interval in such a manner that the duration of the count interval is proportional to the magnitude of the parameter. The duration may be a linear or non-linear function of the magnitude of the parameter as desired.

Other objects and features of the invention will be apparent from the following specific description taken in conjunction with the figures in which:

FIG. 1 illustrates mechanical structure embodying the invention and including a cylindrical surface contacting the moveable element of a pressure transducer and a bank of contact brushes which cooperate with indices on the surface to produce digital signals representative of the pressure;

FIG. 2 is a sectional view of the base of the cylinder illustrating the drive mechanism which rotates the cylinder;

FIG. 3 is an unrolled view of the cylinder surface to illustrate the indices;

FIG. 4 is an enlarged view of the indices to show positional relationships;

FIG. 7 illustrates the unrolled cylindrical surface of a simplified embodiment of the invention to show indices thereon;

FIG. 8 is an enlarged view of a portion of the indices in FIG. 7 to illustrate positional relationships;

FIG. 9 is a block diagram of a computer to which the signals from the simplified embodiment are transmitted for computing the measured parameter; and FIG. 10 illustrates some of the computer waveforms.

Figures 5, 6:
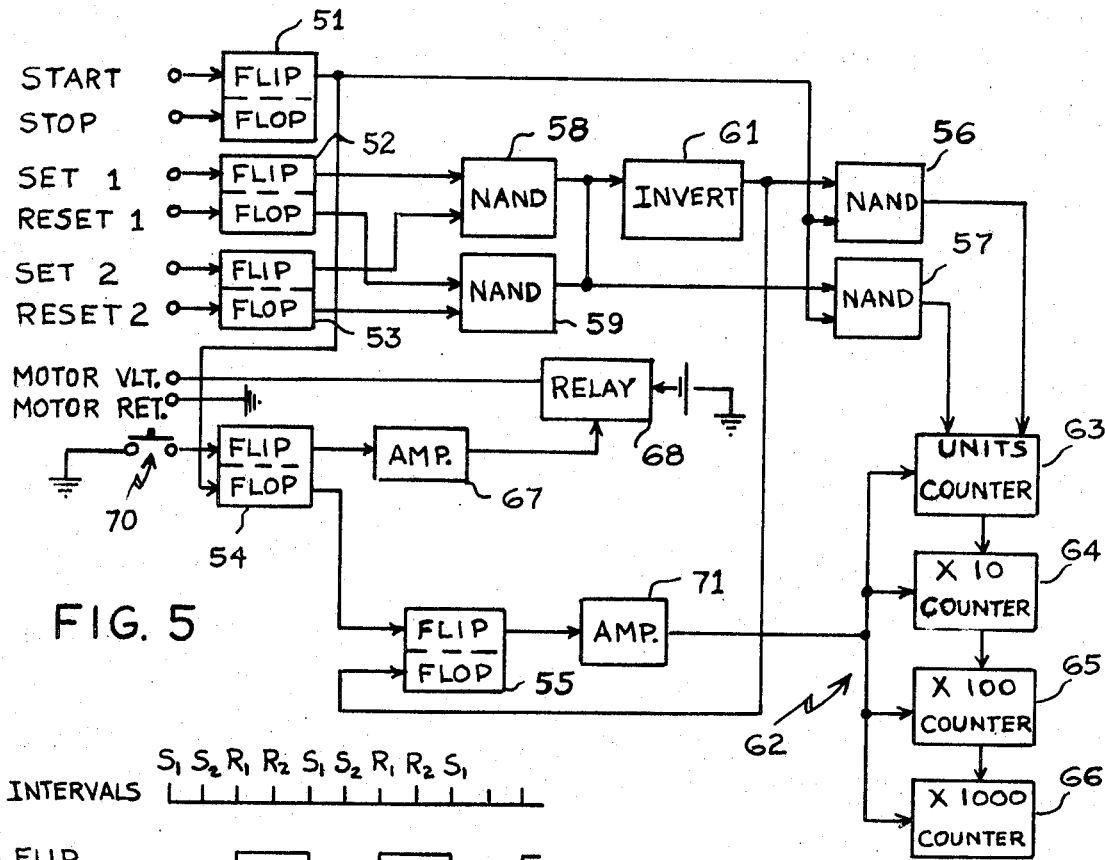
FIG. 5 is a block diagram of computer circuits to which the digital signals are transmitted for computing the measured parameter.
FIG. 6 illustrates some of the computer wave forms as an aid to understanding operation thereof.

Turning first to FIG. 1 which illustrates mechanical features of the invention, there is shown an upright cylindrical drum 1 on an axis 2. The drum is mounted on a platform 3 and is driven in rotation about the axis 2 by a motor drive which may be disposed inside the drum. The platform 3 also carries a transducer such as pressure transducer 4 including, for example, pressure bellows 5 the lower end of which connects to and rotates pivotal arm 6 about its pivot 7 in response to changes in the ambient pressure. As the arm 6 rotates, it positions connector rod 8 which connects to pointer arm 9 rotating the pointer arm about its axle 11. The axle 11 is supported on a pair of stands, one of which (stand 12) is shown. Two oil filled dash pots 13 and 14 have their plungers connected to a damping arm 15 fixed to the pointer arm axle.

The pointer arm 9, axle 11, stand 12, base 3 and any interconnecting bearings are preferably electrically conductive and grounded so that the electrically conductive pointer tip 16 at the end of the arm 9 applies ground potential to the point of contact of the tip on the surface of the drum. The surface of the drum is not electrically conductive except where indicated otherwise.

Thus, the tip applies ground potential to a spot on the surface of the drum which moves vertically substantially parallel to the axis of the drum in response to variations in ambient pressure. The motion of the tip 16 is necessarily arcuate about the axle 11, however, it is substantially transverse to the motion of the surface of the drum when the drum rotates about its axis as indicated by the arrow 17.

The base 3 also carries brush holder 18 which supports a bank 19 of contact brushes each in contact with prescribed electrically conductive indices 21 on the surface of the drum. In operation, the drum is rotated about the axis 2 in the direction of the arrow 17. When the tip 16 of the pointer arm 9 contacts the electrically conductive start index line 22, a start signal is produced in one of the brushes and when the tip contacts the electrically conductive stop index line 23, a stop signal is produced in another of the brushes. Meanwhile other brushes contact the electrically conductive indices 21 to produce pulses in the brushes. These pulses and the start and stop signals are transmitted from the location of the sensor to suitable computer equipment at another location where the signals and pulses are employed to compute the pressure by counting the pulses during the count interval defined by the start and stop signals.

FIG. 2 is a sectional view taken at the bottom of the drum to illustrate a suitable drive mechanism for driving the drum in rotation about the axis 2. This includes a central fixed gear 24 which may be an integral part of a fixed support post 25 attached to the base 3 and one or more planetary gears such as gear 26 which may be connected to the rotor of a motor carried on the inside wall of the cylinder. The motor is not shown, however, it may be mounted by any suitable means on the inside of cylinder 1 so as to drive the planetary gear 26. In fact, two or even three motors may be employed each one driving a planetary gear so that all the gears are drivers. Electrical power to the motor is provided via two of the brushes and certain of the electrically conductive indices 21 on the drum which connect through the drum to the inside where the motor is located.

FIGS. 3 and 4 illustrate the electrically conductive indices on the drum 1 which make electrical contact with the tip 16 or brushes 19 as the drum is rotated. FIG. 3 is an unrolled view of the surface of the drum to illustrate in two dimensions the indices. The electrically conductive start index line 22 and the electrically conductive stop index line 23 are shown as straight in FIG. 3 and curved in FIG. 1. It is preferred that these lines be curved and that the start line 22 be on the same radius as the axle 11 of the arm 9 when in contact with the tip 16 so that an error in readout will not occur if the tip 16 should move transversely after it has contacted the start line 22 and before contacting the stop line 23. However, in order to simplify illustration, the index lines 22 and 23 are shown in FIG. 3 as being straight.

At this lower end, line 22 connects to a short section circumferential line 31. The electrically conductive stop index line 23 connects to the continuous circumferential line 32 via a connecting line 33. The lines 31 and 32 contact start and stop brushes, respectively, of the bank 19 of brushes. The bank includes 9 separate brushes which are designated as follows: Start, stop, reset 1, set 1, ground, set 2, reset 2, motor volts and motor return. This is the positional order of the brushes from the top to the bottom of the set of indices 21 and each brush contacts the correspondingly named index.

The enlarged view in FIG. 4 illustrates the indices 21 and shows the relative positions of the indices and identifies the path of the brush which contacts each index or set of indices. As shown in FIG. 4, the start brush contacts index line 31, the stop brush contacts line 32 and these brushes move along the paths 34 and 35, respectively. The reset 1, set 1, ground, set 2 and reset 2 indices are all electrically connected together and since the corresponding brushes are in line vertically, these brushes cross the indices in the order: reset 1, reset 2, set 1 and set 2 and so the brushes produce electrical pulses in this order. More particularly, the reset 1 brush moves along path 36 and crosses only the reset 1 indices 37, the set 1 brush moves along path 38 and crosses only the set 1 indices 39, the set 2 brush moves along path 41 and crosses only the set 2 indices 42 and the reset 2 brush moves along path 43 and crosses only the reset 2 indices 44. The ground brush carries ground voltage from the base 3 to these indices via the ground line 45.

Electrical power to the motor is provided via the motor volts brush which contacts line 46 and the motor return brush which contacts line 47. In operation, the drum 1 is rotated so that the tip 16 moves across the surface in the direction of the arrow 48. The bank 19 of brushes are positioned along a line 49 such that the distance between the tip 11 and the line 49 never exceeds the length of the line 31. This insures that the start brush will be in contact with the line 31 when the tip 16 crosses the start line 22. The stop brush is at all times in contact with line 32 which connects electrically to the stop line 23 and so no problem arises concerning the distance between the stop brush and the tip 16. This connection 33 is positioned so that the start brush does not contact it at the same instant that the tip could be in contact with the stop line 23. The indices and electrical connections shown in FIGS. 3 and 4 and particularly the manner of connecting the start and stop lines 22 and 23 to their respective brushes could be accomplished in other ways without deviating from the scope of the invention.

FIG. 5 illustrates suitable computer circuits to which the signals generated in the brushes are transmitted and which compute a number representative of the angular position of arm 9 and, thus, representative of the pressure. In a preferred embodiment, the tip 16 and arm 9 are connected to ground potential, so when the tip 16 crosses lines 22 and 23, the start and stop brushes, respectively, are grounded. As already mentioned, line 45 is grounded because its associated brush is grounded and so the set and reset brushes are grounded as each crosses its associated set or reset indices. The computer circuit includes, for example, five double input bistable multivibrator or flip-flop circuits 51 to 55. The inputs to flip-flop 51 connect to the start and stop brushes and one output energizes one side of flip-flop 54 and the NAND gates 56 and 57 so that the gates open when the tip 16 crosses the start line and close when the tip crosses the stop line. Meanwhile the set 1 and reset 1 brushes energize the flip-flop 52 and the set 2 and reset 2 brushes energize flip-flop 53. The complementary outputs of these flip-flops shown as waveforms in FIG. 6, are coupled to NAND circuits 58 and 59 as shown so that the outputs of these circuits combine to produce the pulse train illustrated in FIG. 6. This combined pulse train is fed to NAND circuit 57 and to NAND circuit 56 via inverter circuit 61. The outputs of the NAND circuits 56 and 57 consist of the count pulses shown in FIG. 6 which are fed to the set and reset inputs of the least significant flip-flop of the binary coded decimal counter 62. This counter includes, for example, four connected counters 63 to 66 each counting a different decimal decade. Thus, the counter 62 counts the pulses beginning when the tip 16 crosses the start line 22 and ending when it crosses the stop line 23.

As can be seen from FIG. 6, and in view of the operation of the circiuts, each of the count pulses is formed so that the leading edge and the trailing edge of each count pulse is initiated by one of the set or reset brushes crossing an index line. Furthermore, the NAND circuits 58 and 59 function in conjunction with the flip-flops 52 and 53 so that even if one of the set or reset brushes should contact an index line a plurality of times while crossing it because of, for example, contact bounce, the count pulses in the output of NAND circuits 56 and 57 will be in the proper number.

One side of motor control flip-flop 54 is controlled via interrogating switch 70 and the other side is energized by flip-flop 51. Thus, when switch 70 is closed, the flip-flop 54 energizes amplifier 67 which controls relay 68 feeding power to the motor brushes. Subsequently, when the stop line is crossed, flip-flop 54 switches and the motor is deenergized.

The purpose of flip-flop 55 is to energize amplifier 71 which controls preselected stages in each of the counters 63 to 66. Thus, the amplifier 71 when energized, inserts an initial number into the counter 62. The flip-flop 55 is energized by the flip-flop 54 so that the predetermined initial number is inserted into the counter 62 when the interrogating switch 70 is closed and before the start line 22 is crossed by the tip 16. The initial number preferably represents the value of the parameter being measured when the tip 16 is at the point of divergence 72 of the start and stop lines 22 and 23.

The termination of a count is established when the tip 16 crosses line 23. Then flip-flop 54 switches and the motor is deenergized. Flip-flop 55 switches when the first pulse is produced by inverter circuit 61 so that amplifier 71 is deenergized when the tip 16 crosses start line 22. The preselected initial number is not set into the counter again until the motor is started again. Accordingly, the next time switch 70 is closed and the motor starts, flip-flop 55 is switched and the preselected number is again inserted into the counter.

FIGS. 7 to 9 illustrate another embodiment of the invention and more particularly another set of indices which are imposed on the drum 1 and which require fewer brushes than the embodiment described above. Accordingly, the embodiment in FIGS. 7 to 9 is simpler. The surface of the drum which is shown unrolled in FIG. 7 illustrates the indices in two dimensions. As shown, the start line 81 extends from the top toward the bottom and contacts a short section circumferenital start line 82. Just below line 82 is a closed circumferenital line 83 which engages the stop brush and connects on the surface of the drum to an extension 84 of the stop line 85. Just below this are the set and reset indices 86 and 87, respectively, each of which connects to the closed circumferential ground line 88 and just below these are the closed circumferential motor volts line 89 and motor return line 91. An enlarged view of these indices is illustrated in FIG. 8.

As shown in FIG. 8, seven brushes are employed and identified as the start, stop, set, ground, reset, motor volts, and motor return brushes which move relative to the surface of the drum circumferentially along the paths 92 to 98, respectively. At the same time, the tip 16 of the arm 9 which does not rotate with the drum but moves axially with respect thereto applies ground potential to the start and stop lines 81 and 85 when it crosses these lines. Ground potential applied to line 88 via the ground brush applies ground potential to the set and reset brushes when these brushes cross the set and reset indices 86 and 87.

FIG. 8 illustrates computer circuits located, for example, at a remote computer location and to which signals from the start, stop, set and reset brushes are transmitted. In response to these signals the computer computes a number representative of the position of the tip 16 on the drum and this, of course, represents pressure in the application described. The computer circuit includes three double input bistable multivibrators or flip-flop circuits 102 to 104. The inputs to flip-flop 102 are from the start and stop brushes and the inputs to flip-flop 103 are from the set and reset brushes while flip-flop 104 is controlled by a signal from a switch 105 and the output of the start side of flip-flop 102.

In operation, when the switch 105 is closed, flip-flop 104 switches and energizes amplifier 106 controlling a relay 107 that feeds power to the motor volts and return brushes. Thereafter, as the set and reset brushes cross the set and reset indices 86 and 87, flip-flop 103 switches back and forth producing the pulse trains identified as set and reset in FIG. 10. These set and reset trains are fed to NAND circuits 108 and 109, respectively, which are controlled by flip-flop 102. The outputs of the NAND circuits are fed to counter 111. At the end of a count interval, established when tip 16 crosses line 85, flip-flop 102 switches and resets flip-flop 104 deenergizing the motor. Flip-flop 102 also provides a signal to the counter register which feeds the count number to indicater 112.

This completes description of a number of embodiments of the present invention of structure for converting the mechanical position of an element which represents a parameter to digital pulses and signals such that the pulses may be counted during an interval established by the signals to produce a count number indicative of the magnitude of the parameter. The embodiments each include a drum carrying electrically conductive indices on the outer surface which contact a moveable conductive element or brushes to produce the electrical signals in the element and brushes. Other types of indices and detectors could be substituted for these to produce the same sort of signals without deviating from the scope of the invention. For example, the indices could be magnetized lines on a magnetically permeable coating on the drum and inductive pick-up heads substituted for the moveable element and brushes. Accordingly, the various embodiments of the invention illustrated and described are made by way of example and do not limit the spirit and scope of the invention as set forth in the accompanying claims.

I claim:

1. In a device for counting the passing of indices on a surface by producing pulse signals in an electrical contact brush which contacts said indices,
    means for avoiding the production in said brush of additional pulses caused by intermittent contact of said brush with one of said indices because of brush bounce comprising,
    at least four separate sets of indices spaced along the direction of relative motion of said surface past said brushes,
    said indices of each set being staggered in position relative to indices of each of the other sets,
    a separate brush for contacting each of said sets of indices,
    two bistable switching circuits each responsive to signals from a different pair of said brushes and each producing a pair of complementary output signals,
    means for combining said complementary output signals to produce two trains of alternately disposed pulses,
    means for combining said two trains of alternately disposed pulses to produce a single train of pulses,
    means for inverting said single train of pulses to produce the complement thereof and
    a binary counter the input set and reset stages thereof being responsive to said single train of pulses and said complement thereof, respectively.

2. A transducer for producing signals representative of the rotational position of an arm about the arm axis comprising a movable detector at one end of the arm, a cylindrical surface rotatable about the axis of the cylinder said cylinder axis being perpendicular to the arm axis and aligned with the path of the detector, first means including two indices on the surfaces which define lines on the surface that diverge from a selected point on the surface substantially toward one end thereof, one of said lines being arcuate and exactly parallel to the detector path when the cylinder is in one rotational position, the other line extending from said point to substantially the other end of the cylindrical surface, the detector cooperating therewith to produce an interval signal representative of the detector position, second means including a set of indices on the cylindrical surface and a fixed detector which cooperates therewith to produce cylinder rotation rate pulses, and means coupled to the movable and the fixed detector for counting said pulses during said interval producing a count number representative of the position of the movable detector along the fixed path.

3. A transducer as in claim 2 and in which, said cylindrical surface is substantially electrically nonconductive, said indices are electrically conductive areas on said surface and the movable detector and fixed detector contact said areas when in registry therewith as said cylindrical surface is rotated to produce said interval and said count signals.

4. A transducer as in claim 3 and in which, each of said diverging indices connects electrically with separate other circumferential electrically conductive areas on the surface, the indices of said set are spaced regularly circumferential about the cylinder and all indices in the set connect electrically with another circumferential electrically conductive area on the surface, said fixed detector including separate contact brushes at fixed positions, one contacting each different circumferential conductive area and at least one brush contacting the indices of said set, and the movable detector is a brush for applying a potential to said indices when in contact therewith, whereby said pulses and interval signal are produced in said brushes.

5. A transducer as in claim 4 in which said regularly circumferentially spaced indices include, a plurality of sets of indices, the indices of each set being located at circumferentially staggered positions with respect to the indices of the other sets, each set being in contact with different of said fixed brushes so as to produce separate sets of pulse signals in said fixed brushes on rotation of said cylindrical surface and means responsive to said separate sets of pulse signals for producing a pulse train and responsive to said interval signal for counting the pulses in said train during said interval to produce said summation representative of body position.

6. A transducer as in claim 5 in which, said responsive means includes a separate bistable switching circuit for each different pair of said sets of pulses, each of said bistable switching circuits producing a pair of complementary signals and means for combining said complementary signals from said bistable switching circuit to produce separate pulse trains, each representing a different pair of said sets of regularly spaced indices, whereby said pulse trains are unaffected by intermittent contact with said brushes with a single one of said regularly spaced indices, such as is caused by brush bounce, means for combining said pulse train producing a combined pulse train and means for counting the pulses in said combined pulse train during said interval.

7. A transducer as in claim 5 and in which, there are four separate sets of indices, producing four sets of pulse signals and said means responsive to said sets of pulse signals produces two separate trains of pulse signals, the pulses in one train being staggered in time relative to the pulses in the other train, said responsive means further including, means for combining said trains whereby said counting means counts all pulses in the combined train.

References Cited

UNITED STATES PATENTS

| | | | |
|---|---|---|---|
| 3,024,990 | 3/1962 | Magnuson | 340—347 |
| 3,165,730 | 1/1965 | Robinson | 340—347 |
| 2,597,866 | 5/1952 | Gridley | 340—347 |
| 3,204,235 | 8/1965 | De Rosa | 340—347 |
| 3,248,727 | 4/1966 | Anastasia | 340—347 |
| 3,270,281 | 8/1966 | Mandle | 340—347 |
| 3,357,011 | 12/1967 | Diaz | 340—347 |

MAYNARD R. WILBUR, Primary Examiner

J. GLASSMAN, Assistant Examiner